(No Model.) 2 Sheets—Sheet 1.
F. G. WESTLAND.
FOLDING SPRING SEAT.
No. 602,788. Patented Apr. 19, 1898.
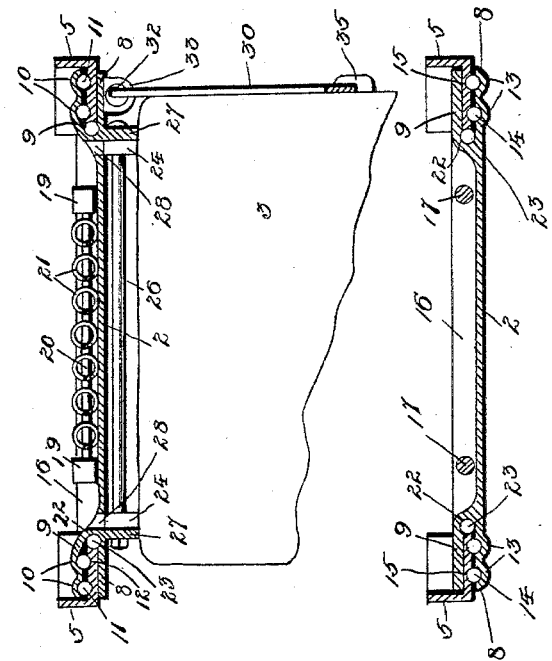
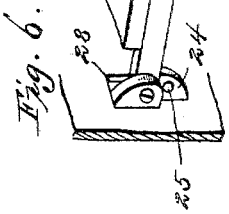
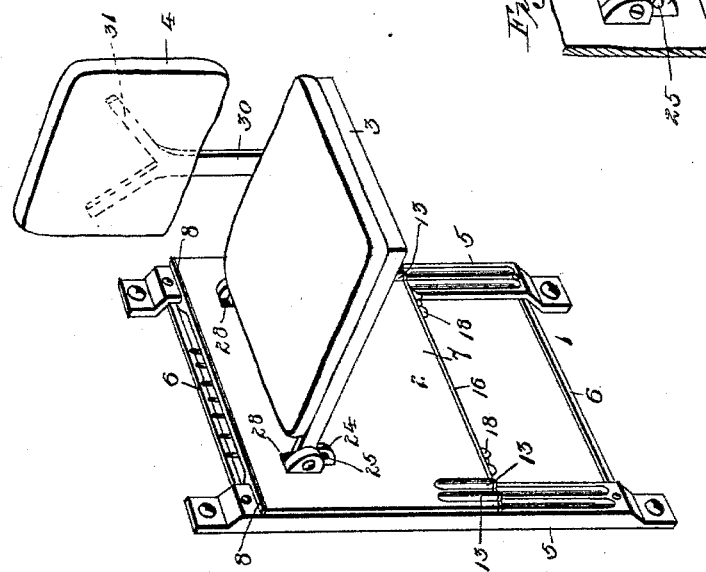
Witnesses
Inventor
Frank G. Westland,
By John Wedderburn
Attorney (No Model.)  2 Sheets—Sheet 2.
F. G. WESTLAND.
FOLDING SPRING SEAT.
No. 602,788. Patented Apr. 19, 1898.
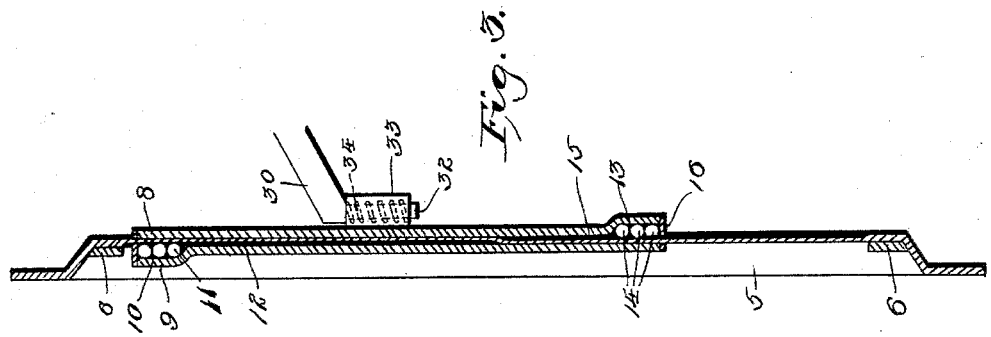
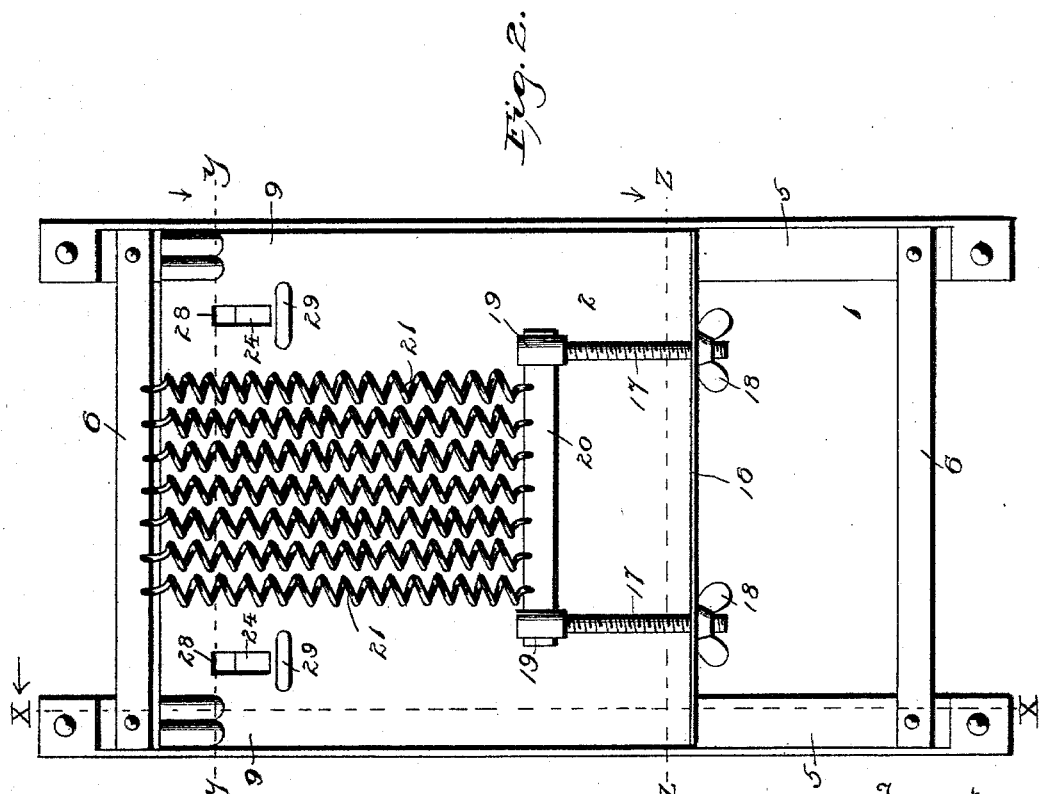
Witnesses
T. L. Mockabee
A. M. Poynton
Inventor
Frank G. Westland,
By John Wedderburn
Attorney

UNITED STATES PATENT OFFICE.

FRANK G. WESTLAND, OF McCOOK, NEBRASKA.

FOLDING SPRING-SEAT.

SPECIFICATION forming part of Letters Patent No. 602,788, dated April 19, 1898.

Application filed March 31, 1897. Serial No. 630,047. (No model.)

*To all whom it may concern:*

Be it known that I, FRANK G. WESTLAND, a citizen of the United States, residing at McCook, in the county of Red Willow and State of Nebraska, have invented certain new and useful Improvements in Folding Spring-Seats; and I do hereby declare the following to be a full, clear, and exact description of the invention, such as will enable others skilled in the art to which it appertains to make and use the same.

This invention relates to improvements in seats, and has more particular relation to folding spring-seats.

The object of the invention is to provide a folding spring-seat for application to the cab of a locomotive for the engineer and so constructed that the same may be instantly turned down out of the way or adjusted to operative position at will.

The invention consists of certain novel constructions, combinations, and arrangements of parts, all of which will be hereinafter more particularly set forth and claimed.

In the accompanying drawings, forming part of this specification, Figure 1 represents a perspective view of a seat embodying my invention adjusted to operative position. Fig. 2 represents a rear elevation of my said improvement. Fig. 3 represents a vertical section on the line $x\ x$ of Fig. 2. Fig. 4 represents a transverse section on the line $y\ y$ of Fig. 2. Fig. 5 represents a transverse section on the line $z\ z$ of Fig. 2; and Fig. 6 represents an enlarged detail perspective view of a section of the slide and seat, showing the formation of the lugs and slot for permitting of the pivotal movement of the seat.

1 in the drawings represents the attaching-frame; 2, the slide; 3, the pivoted seat, and 4 the pivoted back-rest.

The frame 1 comprises sides 5, constructed of angle-iron, and connecting end strips 6 6, suitably bolted thereto.

The slide 2 comprises a metallic plate 7, provided at each of its vertical edges with two spaced flanges 8 and 9, respectively, said flanges fitting upon the side of the respective angle-irons 5. The upper portions of the flanges 9 are provided with two parallel ball-runs 10, in which are mounted antifriction-balls 11, which bear in ball runs or grooves 12, formed in the rear face of said angle-irons 5. The lower portion of each of the flanges 8 is provided with two parallel ball-runs 13, in which are mounted antifriction-balls 14, which run in ball-grooves 15, formed at the lower ends of the angle-irons 5. The balls are prevented from passing out of the ball-runs 13 by a plate 16, secured over the lower ends of the same by bolts 17, passing therethrough, and thumb-nuts 18, mounted on said bolts. The upper end of each of the bolts 17 is provided with an eye 19, a cross-bar 20 having its respective ends mounted in said eyes 19. This bar 20 is connected with the upper bar 6 of the frame by a plurality of coil-springs 21.

It will be observed from the foregoing description that the slide 2 is normally held up, but may be depressed against the tension of the said springs 21, which tension may be increased or decreased at will by adjusting the bolts 17 through the medium of the thumb-nuts 18. To prevent any lateral friction upon the movement of the slide 2, ball-runs 22 are formed at the edges of said slide and adapted to contain balls 23, which bear against the edges of the respective angle-irons.

It will be observed that by the peculiar arrangement of the respective ball-runs 10 and 13 at the upper and lower ends of the slide and bearing respectively against the back and the front of the angle-irons through the medium of the antifriction-balls 11 and 14 any strain thrown upon the upper portion of the slide will be met and resisted in the most efficient manner.

The seat 3, which may be of any desired upholstered pattern, is provided with a plurality of spaced brackets 24, each of which is formed with an elongated vertical slot 25, the latter adapted to receive a pivoted rod 26, which has its respective opposite ends supported in lugs 27, mounted upon said slide 2. Apertures 28 are formed in said slide in proximity to said lugs 27, but out of the same vertical planes therewith. The slide 2 immediately below the lower ends of said slots 28 is reinforced by a shoulder 29, so that any excessive pressure of the brackets 24 will not indent or bend said slide.

When the seat 3 is in its extended position, the rod 26 lies in the upper ends of the slots 25, thus permitting the lower ends of the brackets 24 to pass below the lower ends of the slots 28 and rest against the slide 2. When it is desired to lower the seat 3, the same is first slightly raised, thus permitting the lower ends of the brackets 24 to pass through the slots 28 and the said brackets to rotate upon the rods 26.

The back support 4 may be of any desired upholstered construction and is supported in position by an angular arm 30, having a fork 31 at its upper end and a pendent stud 32 at its lower end. This stud is journaled in an apertured lug 33, mounted upon the slide 2 and is surrounded by a coil-spring 34, which is connected thereto and to said lug 33, so that the back 4 is normally swung parallel with the wall of the cab when released from the seat. Said back support is held in the proper position in relation to the seat 3 by a pivoted catch 35, mounted upon the under side of the seat and adapted to engage the angular arm 30.

It will be observed from the foregoing description that a person seated upon the seat 3 when in its extended position will be supported by the springs 21, and will thus be relieved of all vibration or jarring of the engine. In order to release the seat it is simply necessary to raise the same and unhook the catch 35, when said seat will drop and the back automatically turn against the wall of the cab out of the way.

By means of the peculiar arrangement of the antifriction-balls the vertical movement of the slide bearing the seat is attended with a minimum amount of friction, and the full effect of the springs supporting the slide is thus secured.

By the employment of my improved device engineers are altogether protected from the injurious vibration of the locomotive, which often results in temporarily, if not permanently, disabling them for active service.

Having thus described my invention, what I claim as new, and desire to secure by Letters Patent, is—

1. The combination with a supporting-frame, of a spring-pressed slide mounted on the same, a seat hinged on said slide so as to be turned up or down at will, and a back also pivotally mounted upon said slide and adapted to be turned out against the edge of the seat or flattened against the slide out of the path of the seat at will, substantially as described.

2. The combination with a suitable supporting-frame containing ball-runs, of a spring-pressed slide mounted on said frame and also formed with ball-runs, antifriction-balls applied in the ball-runs between the slide and frame a seat hinged on said slide so as to turn up or down at will, and a back also pivotally mounted on the slide so that it may be turned back flat against the slide out of the path of the seat, substantially as described.

3. The combination with a suitable supporting-frame, of a slide mounted thereon, a flange mounted on said slide, bolts passed through said flange, thumb-nuts applied on said bolts so as to engage said flange, a cross-bar connecting said bolts, springs connecting said cross-bar and the frame, and a seat mounted on said slide, substantially as described.

4. The combination with a supporting-frame containing ball-runs, of a slide mounted thereon also formed with ball-runs, springs connecting said slide and said frame, anti-friction-balls in said ball-runs between the frame and slide, a seat hinged upon said slide so as to be turned up or down at will, a back-rest pivoted on said slide so as to be turned out against the seat, or back against the slide at will, and a catch mounted on the seat for holding the back in its operative position, substantially as described.

5. The combination with a supporting-frame, of a spring-pressed slide mounted thereon and formed with lateral apertures and apertured lugs in proximity to said apertures, a seat provided with brackets having elongated slots and a pivoted rod passed through the apertured lugs and said elongated slots; the construction being such that the said brackets may be passed through the slots of the slide when so desired to permit the same to be lowered, substantially as described.

6. The combination with a supporting-frame, of a slide mounted thereon, springs connecting said slide and said frame, adjusting-bolts connected to said springs, thumb-screws for moving said bolts longitudinally to increase or decrease the tension of said springs, and a seat hinged to said slide so that it may be turned up or down at will, substantially as described.

7. The combination with a supporting-frame, of a slide mounted thereon, springs connecting said slide and said frame, a seat pivoted on said slide so that it may be turned up or down at will, a back-support pivoted on said slide, a spring connecting said back-support and slide so that the former is normally held against the latter, and a catch mounted on the seat for securing the back-support in position thereon, substantially as described.

In testimony whereof I have signed this specification in the presence of two subscribing witnesses.

FRANK G. WESTLAND.

Witnesses:
G. W. CONNER,
H. G. BONEMAN.